United States Patent
Morin et al.

(10) Patent No.: US 10,602,766 B2
(45) Date of Patent: Mar. 31, 2020

(54) APPARATUS FOR PREPARING FEED FOR ANIMALS

(71) Applicant: SEB S.A., Ecully (FR)

(72) Inventors: Gilles Morin, Varois et Chaignot (FR); Lionel Averty, Dijon (FR); Annabelle Goyon, Marcilly-sur-Tille (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 16/303,505

(22) PCT Filed: May 22, 2017

(86) PCT No.: PCT/FR2017/051261
§ 371 (c)(1),
(2) Date: Nov. 20, 2018

(87) PCT Pub. No.: WO2017/203152
PCT Pub. Date: Nov. 30, 2017

(65) Prior Publication Data
US 2019/0335798 A1    Nov. 7, 2019

(30) Foreign Application Priority Data

May 23, 2016 (FR) ..................... 16 54601

(51) Int. Cl.
*B01F 15/02* (2006.01)
*A23N 17/00* (2006.01)
(Continued)

(52) U.S. Cl.
CPC ............ *A23N 17/007* (2013.01); *A01K 5/002* (2013.01); *A01K 5/0216* (2013.01);
(Continued)

(58) Field of Classification Search
CPC .................................................. B01F 15/0295
(Continued)

(56) References Cited

U.S. PATENT DOCUMENTS 2,992,813 A * 7/1961 Bonomo ................ A21C 1/06
366/97
4,404,168 A * 9/1983 Baumberger ..... B01F 15/00025
366/138
(Continued)

FOREIGN PATENT DOCUMENTS

BE          527 389 A       10/1956
DE   20 2008 001482 U1    4/2008
(Continued)

OTHER PUBLICATIONS

International Preliminary Report on Patentability and the Written Opinion of the International Searching Authority as issued in International Patent Application No. PCT/FR2017/051261, dated Nov. 27, 2018.
International Search Report as issued in International Patent Application No. PCT/FR2017/051261, dated Sep. 27, 2017.

*Primary Examiner* — David L Sorkin
(74) *Attorney, Agent, or Firm* — Pillsbury Winthrop Shaw Pittman LLP

(57) ABSTRACT

A preparation apparatus for preparing feed for animals, includes a first storage container for storing a dehydrated feed, a second storage container for storing a liquid such as water, mixing chamber, a mixer for mixing the dehydrated feed and the liquid in order to form a feed ration in paste form, and a consumption container arranged to receive the feed ration, wherein the mixing chamber includes an opening, the mixing chamber is mounted movable relative to the preparation apparatus, so as to move from a first position to a second position.

15 Claims, 8 Drawing Sheets

(51) Int. Cl.
*A01K 5/00* (2006.01)
*A01K 5/02* (2006.01)
*B01F 3/12* (2006.01)
*B01F 7/24* (2006.01)

(52) U.S. Cl.
CPC .......... *A01K 5/0275* (2013.01); *B01F 3/1221* (2013.01); *B01F 3/1271* (2013.01); *B01F 7/246* (2013.01); *B01F 15/0237* (2013.01); *B01F 15/0251* (2013.01); *B01F 2215/0024* (2013.01)

(58) Field of Classification Search
USPC .................................................. 366/46, 185
See application file for complete search history.

(56) References Cited

U.S. PATENT DOCUMENTS

| | | | |
|---|---|---|---|
| 4,684,259 A * | 8/1987 | Rice .................... | B01F 15/0074 366/185 |
| 8,511,519 B2 | 8/2013 | Mahle et al. | |
| 2004/0100857 A1 * | 5/2004 | Harris ................. | B01F 15/0217 366/8 |
| 2009/0173282 A1 | 7/2009 | Wu et al. | |

FOREIGN PATENT DOCUMENTS

| | | |
|---|---|---|
| FR | 2 785 767 A1 | 5/2000 |
| GB | 2 016 291 A | 9/1979 |

* cited by examiner

APPARATUS FOR PREPARING FEED FOR ANIMALS

CROSS-REFERENCE TO RELATED APPLICATIONS

This application is the U.S. National Stage of International Application Serial No. PCT/FR2017/051261, filed May 22, 2017, which in turn claims priority to French Application No. 1654601, filed May 23, 2016. The contents of all of these applications are incorporated herein by reference in their entirety.

This invention concerns in general an appliance for preparing animal feed, intended to help a user to prepare a feed ration for his companion animal, such as a dog or a cat, for example.

Devices for preparing feed for domestic animals are known in the prior art, such as the one described in the document U.S. Pat. No. 8,511,519B2, for example. On the other hand, this system has in particular the disadvantage of offering feed only in solid form, which may not be suitable for certain animals.

One goal of this invention is to respond to the aforementioned disadvantages of the prior art and in particular, first of all, to propose an appliance for preparing animal feed that is easy to use, but that helps with preparing an appetizing feed ration for the animal.

For this purpose, a first aspect of the invention concerns an appliance for preparing animal feed comprising:
  means for storing a dehydrated feed,
  means for storing a liquid such as water,
  a mixing chamber designed to receive a portion of dehydrated feed and a portion of liquid,
  mixing means movably arranged in the mixing chamber to mix the portion of dehydrated feed and the portion of liquid to form a feed ration in paste form,
  a consumption container designed to receive the feed ration, characterized in that:
  the mixing chamber comprises an opening,
  the mixing chamber is mounted such that it is movable in relation to the preparation appliance, in order to go from a first position, or mixing position, in which the opening is opposite an area for dispensing of dehydrated feed and liquid, to a second position, or dispensing position, in which the opening is opposite the consumption container. The preparation appliance according to this invention allows animal feed to be prepared automatically in paste or mash form. In fact, the appliance automatically mixes the liquid and the dehydrated feed until a paste is obtained, and delivers the paste or mash automatically into the consumption container without intervention by the user. In addition, the appliance is still simple, because only one opening in the mixing chamber is needed in order to receive the ingredients and dispense the paste obtained, because it is the mixing chamber that is movable in relation to the preparation appliance, in order to present the opening either opposite the dispensing area to receive the main ingredients (liquid and dehydrated feed), or opposite the consumption container (which may be a bowl) to dispense the mash to the animal.

Advantageously, when the mixing chamber is in the first position, the opening is situated in the upper part of the mixing chamber, and when the mixing chamber is in the second position, the opening is situated in the lower part of the mixing chamber. The invention advantageously takes advantage of the force of gravity to receive the ingredients and dispense the mash obtained.

Advantageously, the mixing chamber is able to move in rotation about a rotation axis.

Advantageously, the mixing means comprise a mixing paddle.

Advantageously, the mixing paddle is able to move in rotation about the same rotation axis as the mixing chamber. Because the mixing chamber is able to move in rotation in relation to the appliance, the mixing chamber has rotational symmetry, and making the mixing paddle able to move in rotation creates synergy so that the ingredients contained in the mixing chamber can be mixed effectively.

Advantageously, the mixing paddle is designed to guide the ingredients from the mixing chamber towards an extremity of the mixing chamber opposite the opening when it pivots in a first direction of rotation, and the mixing paddle is designed to guide the ingredients from the mixing chamber towards the opening when it pivots in a second direction of rotation. This implementation minimizes the complexity of the appliance, since the mixing paddle combines the functions:
  by rotating in the first direction of rotation, the mixing paddle moves the ingredients that have just been introduced into the mixing chamber away from the opening of the mixing chamber then in the first position, which prevents blocking or obstructing the opening,
  the mixing paddle mixes the ingredients with one another,
  by rotating in the second direction of rotation, the mixing paddle returns the mixed ingredients towards the opening of the mixing chamber then in the second position, and allows the mash to push through the opening, so that the mash is discharged into the consumption container.

Advantageously, the preparation appliance comprises a channel for supply of liquid, with a downstream extremity arranged above the opening when the mixing chamber is in the first position, so as to cause the liquid to flow into the mixing chamber without contact with the dispensing area and/or the opening. The downstream extremity of the supply channel is designed so that the stream or spray of liquid falls directly into the mixing chamber without touching, nor flowing or running off onto the walls of the dispensing area, or those of the mixing chamber. The falling occurs by gravity and the walls are not made wet, which prevents the dehydrated feed or dust from sticking to the walls.

Advantageously, the preparation appliance comprises means for supplying the mixing chamber with dehydrated feed, with a dehydrated feed supply hatch designed to cause the dehydrated feed to fall through the opening into the mixing chamber in the first position, and the supply hatch and the downstream extremity of the liquid supply channel are offset and at a distance from one another so as to allow the mixing chamber to be supplied with liquid and dehydrated feed simultaneously, without contact between the liquid and the dehydrated feed at the dispensing area and/or at the opening. No contact between the liquid and the dehydrated feed takes place before these ingredients are completely inside the mixing chamber. In this way, the dispensing area and the adjacent walls of the mixing chamber stay clean.

Advantageously, the means for supplying the mixing chamber with dehydrated feed comprise a feed screw arranged between the means for storing the dehydrated feed and the supply hatch. Such a feed screw, with a helical thread, for example, allows easily and precisely metering the volume of dehydrated feed based on the number of rotations of the screw.

Advantageously, the dispensing area comprises inclined walls designed to redirect the dehydrated feed and guide it towards the opening of the mixing chamber in the first position.

Advantageously, the preparation appliance comprises means for storing a food supplement, in particular in liquid form. Such a food supplement makes it possible to provide vitamins or health products on an occasional basis, on a planned basis (every 2 or 3 meals or once a week, for example), or according to a particular need.

Advantageously, the food supplement is contained in a removable cartridge. This makes it possible to easily choose, vary and adapt the food supplements to be added to the base dehydrated feed.

Advantageously, the removable cartridge comprises a piston, and the appliance comprises pushing means designed to move the piston a predetermined distance. It is easy to implement such volume metering.

Advantageously, the removable cartridge comprises an outlet arranged above the opening of the mixing chamber in the first position, and the outlet of the removable cartridge, the supply hatch and the downstream extremity of the liquid supply channel are offset and at a distance from one another, so as to allow the mixing chamber to be supplied with food supplement and liquid and/or dehydrated feed simultaneously, without contact between the food supplement and the liquid and/or dehydrated feed at the dispensing area and/or at the opening. In this way, the dispensing area and the adjacent walls of the mixing chamber stay clean.

Other characteristics and advantages of this invention will be seen more clearly by reading the following detailed description of an embodiment of the invention, provided as a non-restrictive example, and illustrated by the attached drawings in which:

FIG. 5b represents a pot forming a part of the mixing chamber of FIG. 5a;

FIG. 6 represents a perspective view of an animal feed preparation appliance according to this invention accommodating the mixing chamber of FIG. 5a;

FIGS. 6, 10, 11 and 12 represent general views of a preparation appliance 500 according to this invention, which comprises a main body supported by a bracket 401, which also supports a consumption container 400 (such as a bowl, for example).

Figure 10:
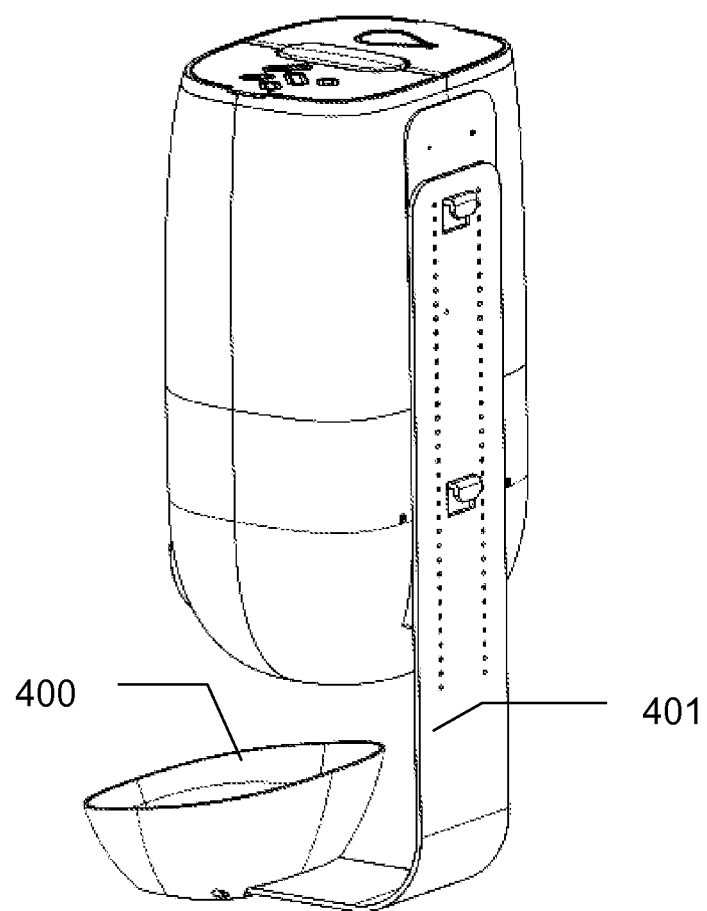
FIG. 10 represents a view of the back of the preparation appliance of FIG. 6.

FIG. 10 shows that the main body may be positioned at different altitudes with respect to the bracket 401, so as to be able to adjust a height between the main body and the consumption container 400, depending on the size of the animal to be fed. For this purpose, a plurality of holes are provided in the bracket 401, in order to be able to screw it at the appropriate height in tapped holes in the main body. As for the bracket 401, it is fixed to a wall, for example, in order to hold the preparation appliance 500 and the consumption container 400 in place.

Figure 11:
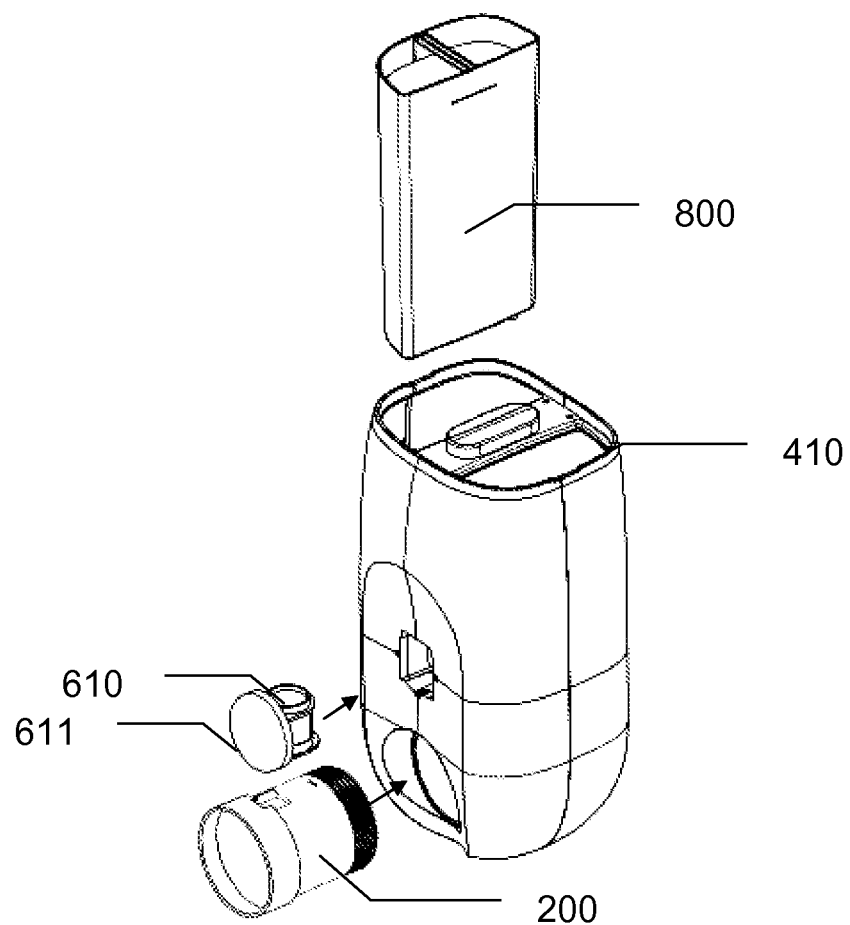
FIG. 11 represents an exploded view of the preparation appliance of FIG. 6.

FIG. 11 shows that the preparation appliance 500 may removably receive several elements including a liquid reservoir 800, a removable cartridge 610 and a mixing chamber 200 in which at least one liquid (such as water, for example) and a dehydrated feed are mixed in order to form a feed ration in mash form that will then be dispensed into the consumption container 400. A tray 410 is also provided in the body of the preparation appliance 500, to serve as storage means for the dehydrated feed.

Figure 12:
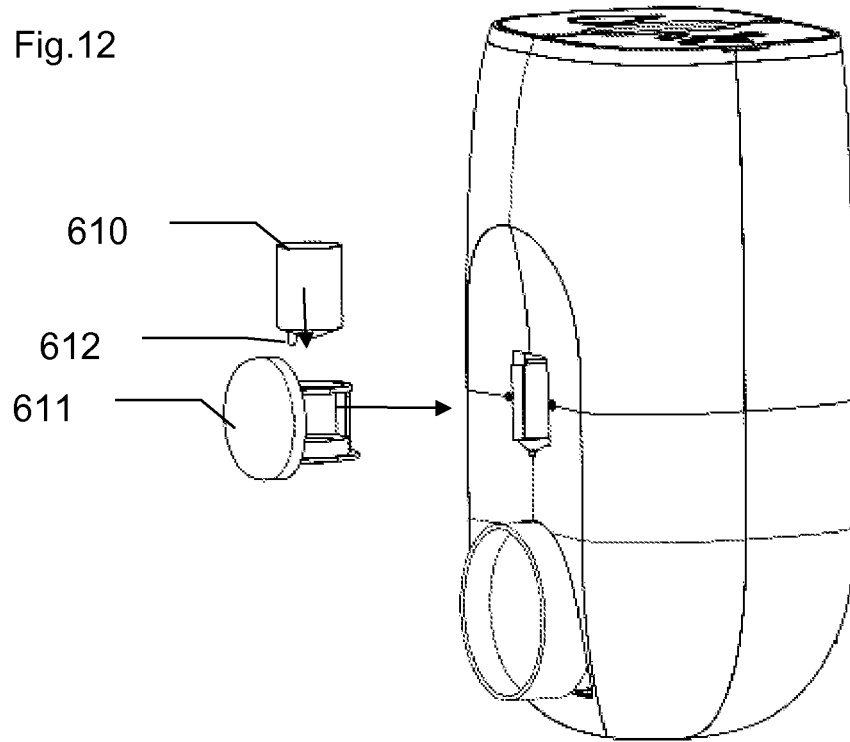
FIG. 12 represents a view detailing a removable cartridge of the preparation appliance of FIG. 6.

The preparation appliance 500 can also removably receive the removable cartridge 610 and its support 611, whose very simple assembly is shown in FIG. 12. In fact, the removable cartridge 610, which contains a food supplement to be included in the ingredients to be mixed if needed, may be mounted in its support 611, and the subassembly is then snap-fitted or inserted into the main body of the preparation appliance 500, above the mixing chamber, so that a defined quantity of food supplement can easily be included in the animal's feed ration, as will be explained later.

Figure 1:
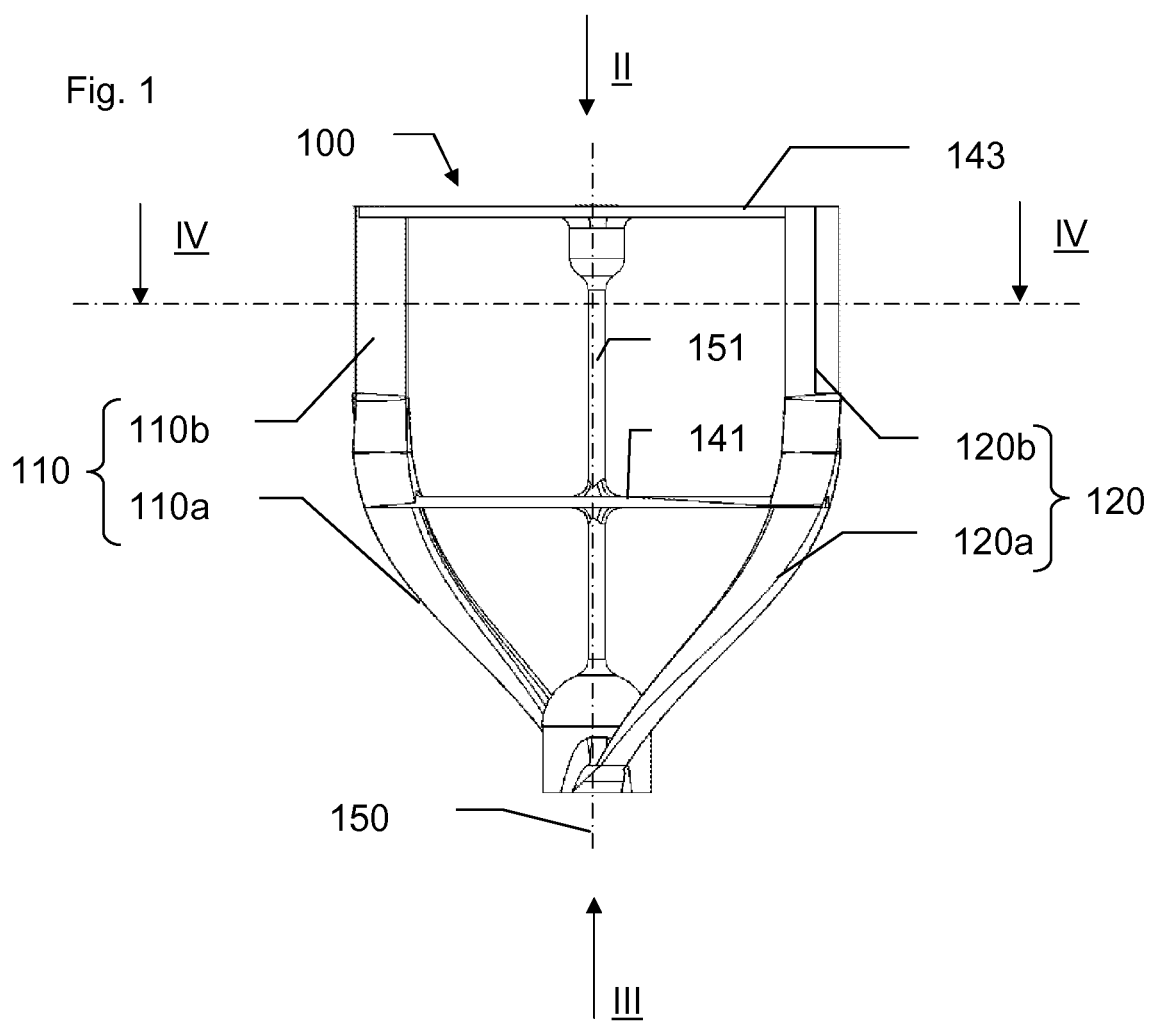
FIG. 1 represents a side view of a mixing paddle designed to be received in a mixing chamber of a preparation appliance according to this invention.

FIG. 1 represents a mixing paddle 100 designed to be received in the mixing chamber 200 of the preparation appliance 500 according to this invention, which comprises a first eccentric arm 110 and a second eccentric arm 120, both of them eccentric with respect to a rotation axis 150, about which the mixing paddle rotates when it is used in the animal feed preparation appliance 500.

In fact, the mixing paddle 100 is designed to be received in the mixing chamber 200 (visible in FIGS. 5a, 6, 7 and 11) of the animal feed preparation appliance 500 (visible in FIG. 6), in order to mix ingredients in it such as a serving of dehydrated feed with a liquid. For this purpose, it is envisioned to drive the mixing paddle 100 in rotation about the rotation axis 150, in order first to mix the dehydrated feed with a liquid such as water, and then to knead this mixture to obtain a homogeneous paste, and then dispense the paste into the consumption container 400 (visible in FIG. 6) accessible to the animal so that he can consume this freshly prepared mash.

To return to FIG. 1, each eccentric arm 110 and 120 comprises a first portion 110a and 120a, respectively, inclined with respect to a plane containing the rotation axis 150, so as to cause the ingredients contained in the mixing chamber to move in a first axial direction (the direction II in FIG. 1) when the mixing paddle rotates in a first direction of rotation. Advantageously, the first portions 110a and 120a are helical in shape in order to form a portion of a screw conveyor. In this way, when the mixing paddle rotates in a second direction of rotation opposite the first direction of rotation, the first portions 110a and 120a cause the ingredients contained in the mixing chamber to move in a second axial direction, the direction III in FIG. 1.

In addition, each eccentric arm 110 and 120 comprises a second portion 110b and 120b, respectively, arranged upstream of the first portion 110a and 120a with respect to the first axial direction II, having a cross section oriented radially with respect to the rotation axis 150 in order, when the mixing paddle 100 rotates in a second direction of rotation, to bring about a radial movement of the ingredients contained in the mixing chamber 200 towards the outside of the mixing chamber 200, these ingredients then being returned towards the second portion 110b and 120b by the first portion 110a and 120a.

In fact, the invention proposes to make the mixing paddle 100 rotate in two contrary directions of rotation, depending on the result to be achieved, as is explained below.

Figure 5A:
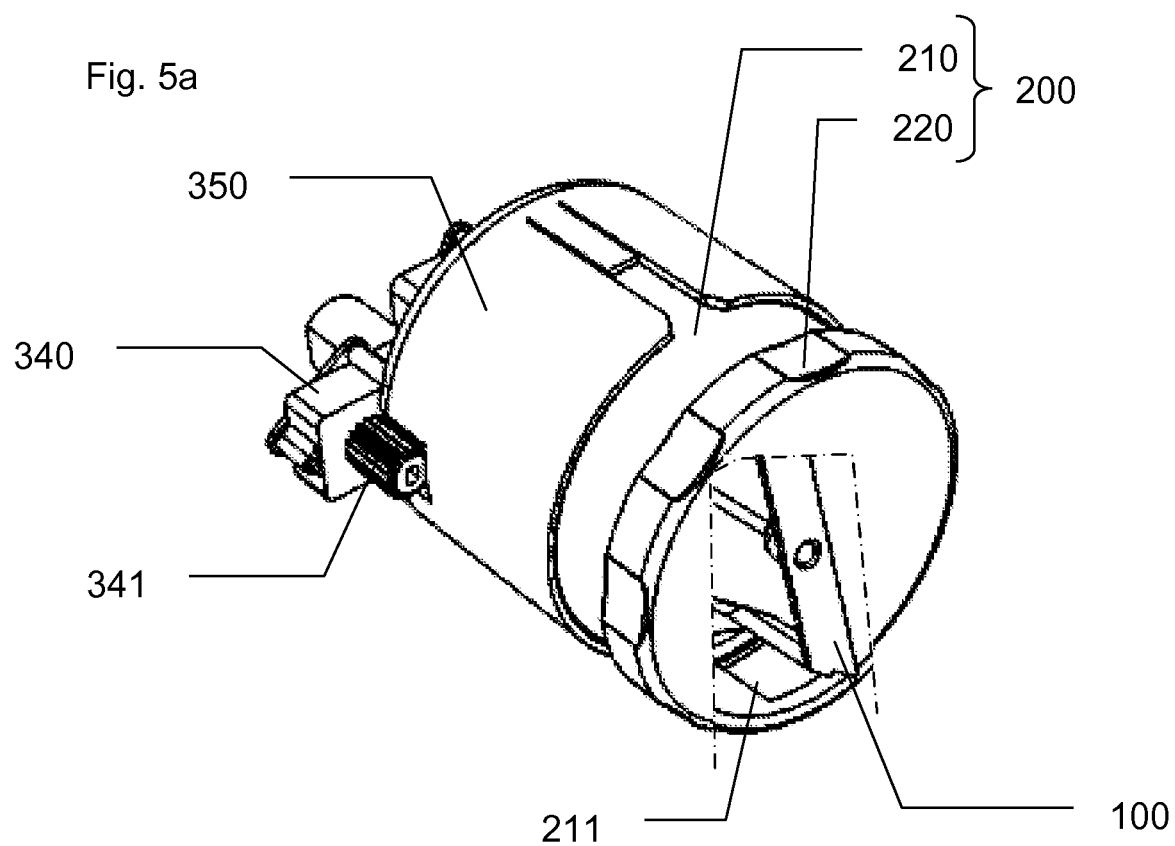
FIG. 5a represents the mixing paddle of FIG. 1 placed in the mixing chamber of the preparation appliance according to this invention.
Figure 5B:
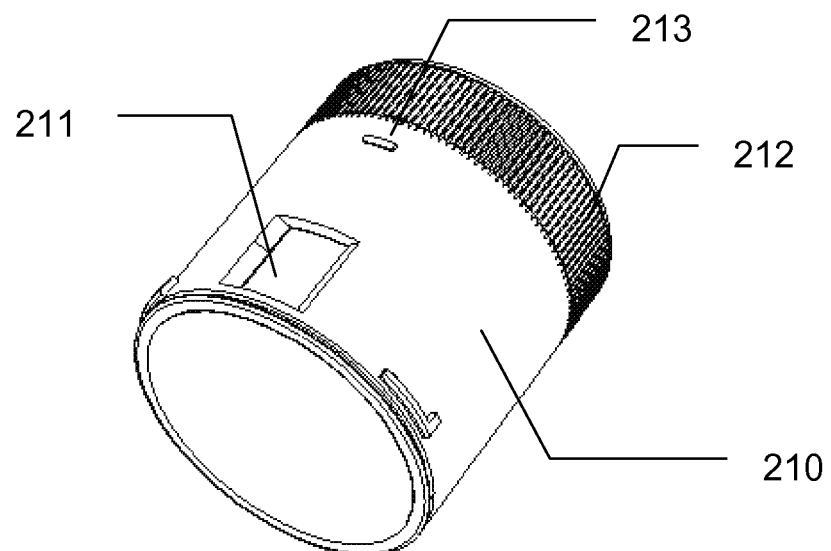
Figure 6:
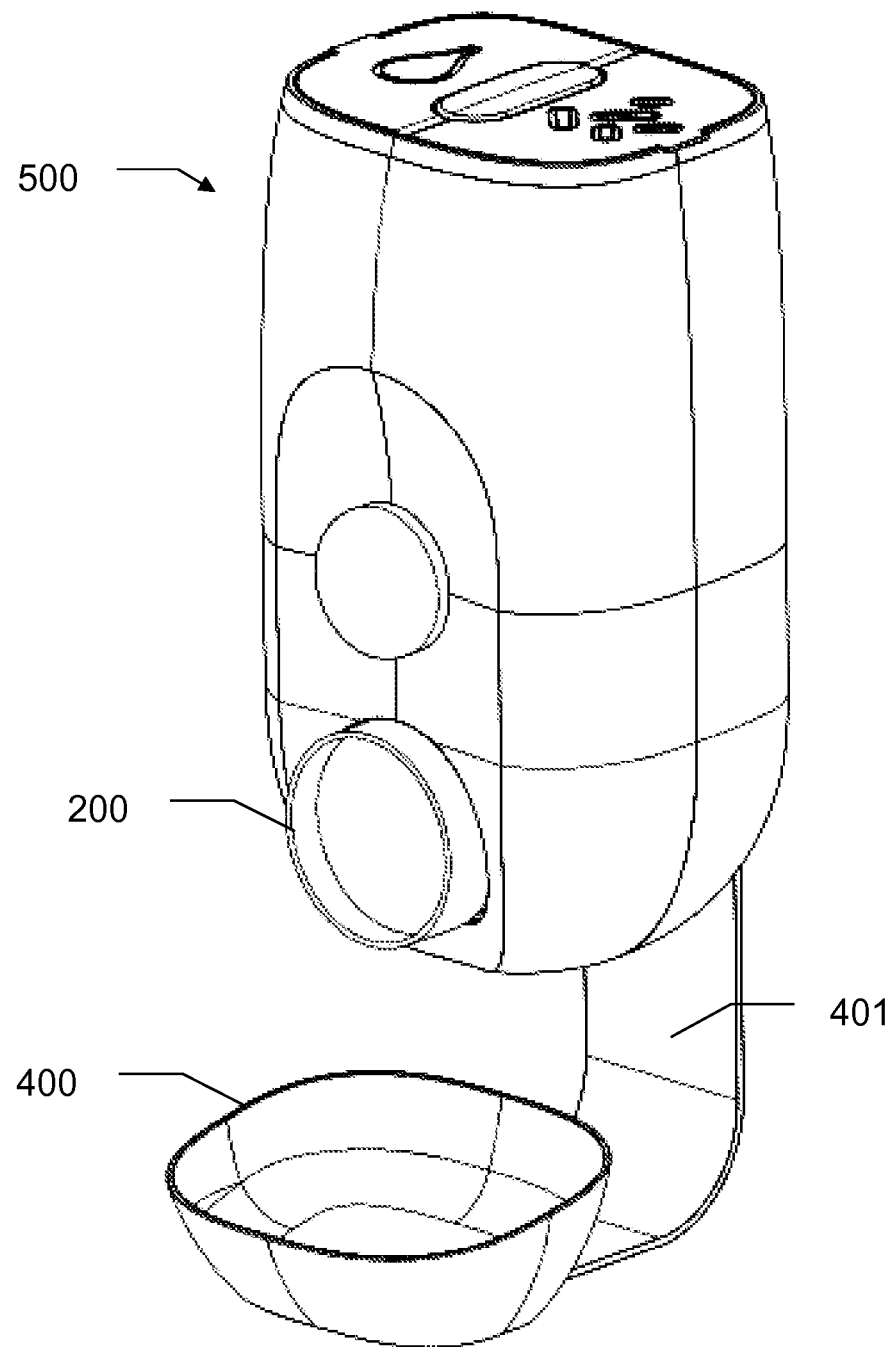

As shown in FIG. 5a, the mixing chamber 200 comprises a pot 210 closed with a cover 220, the mixing paddle 100 being arranged inside the pot 210 closed with the cover 220. The mixing chamber 200 also comprises an opening 211 shown through the cover 220 in a partial cross section. As seen in FIGS. 5a and 5b, the opening 211 is formed in the pot, but it would be possible to envision establishing the opening 211 in the cover.

The preparation appliance 500 comprises a geared motor 340 with a pinion 341 which can cause the mixing chamber 200 to pivot when it is placed in a housing 350 of the preparation appliance 500. In the rest of the presentation, the bottom of the pot 210 will be considered to form a first extremity of the mixing chamber 200, and the cover 220 is then placed at a second extremity of the mixing chamber 200.

In a first position, the mixing chamber 200 is placed in the housing 350 with the opening 211 at the top of the mixing chamber 200, such that the ingredients (the dehydrated feed, the liquid and possibly a food supplement) fall by gravity into the mixing chamber 200, thus on the side of the second extremity.

During a first preparation phase, it is thus envisioned to make the mixing paddle 100 rotate in a first direction of rotation so that the ingredients are pushed or displaced by the first portions 110a and 120a towards the first extremity of the mixing chamber 200 (thus according to the direction II of FIG. 1) to prevent an accumulation of ingredients at the opening 211.

This first preparation phase may last several minutes, the time for pushing the ingredients towards the bottom of the pot 210 and mixing them and kneading them to obtain a homogeneous paste or mash ready to be consumed by the animal. It could also be envisioned to temporarily interrupt the rotation to allow the liquid to penetrate the dehydrated feed properly. To effectively mix the ingredients, the first portions 110a and 120a have an elongated cross section which is substantially perpendicular to their direction of travel, but the length of this cross section is limited to 12 mm, for example, and more particularly to 10 mm, to prevent any fouling around the mixing paddle. In addition, this cross section may have a minimum surface area of 20 mm$^2$, which provides it with adequate strength.

The mixing paddle 100 can be made of acrylonitrile butadiene styrene or ABS, polyoxymethylene (or polyformaldehyde), abbreviated POM, or polyamide, abbreviated PA. Of course, one could envision adding reinforcing fibers to the material.

A second preparation phase can then begin, in order to dispense the mash in the consumption container 400. For this purpose, the geared motor 340, by means of the pinion 341 which engages with a toothed portion 212 of the pot 210 (visible in FIG. 5b), causes the mixing chamber 200 to pivot in the housing 350, in order to bring the opening 211 to the bottom of the mixing chamber.

At this moment, by causing the mixing paddle 100 to rotate in a second direction of rotation (opposite the first direction of rotation of the first preparation phase), the ingredients are then brought by the first portions 110a and 120a towards the second extremity of the mixing chamber, that is, towards the second portions 110b and 120b, situated opposite the opening 211.

Figure 4:
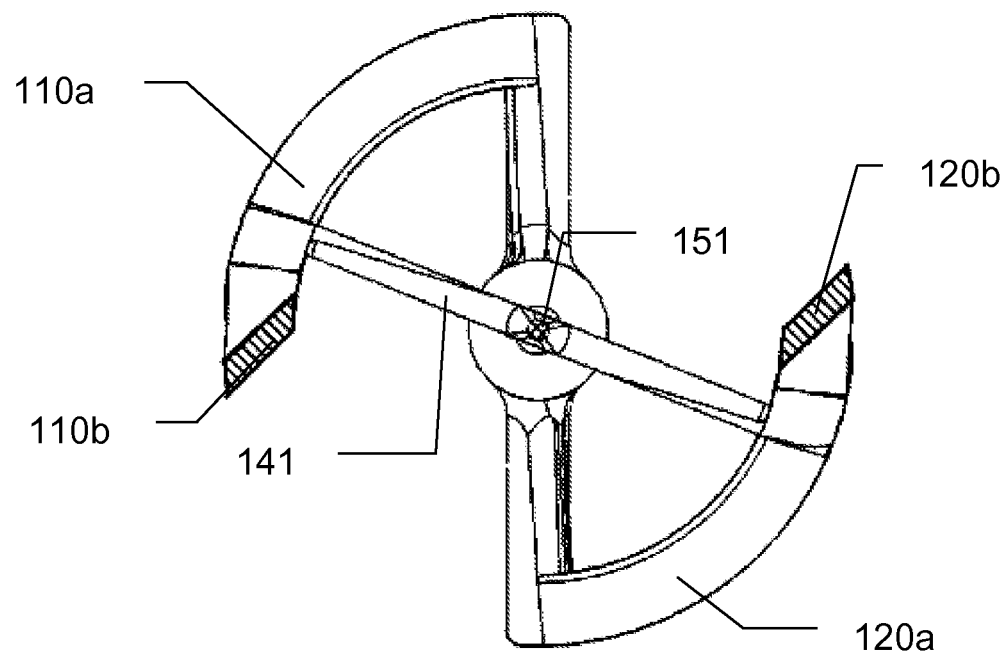
FIG. 4 represents a cross section of the mixing paddle of FIG. 1, according to the axis IV-IV of FIG. 1.

The oriented cross section of the two portions 110b and 120b, as can be seen in FIG. 4, then has the effect of pushing the ingredients towards the outside of the mixing chamber, in this way causing the mash to pass through the opening 211, and then to fall by gravity into the consumption container 400 situated just beneath. The length of the second portions 110b and 120b is calculated so that at least a part of these second portions 110b and 120b is opposite the opening 211.

When it rotates in the first direction of rotation, the mixing paddle 100 thus has the effect of displacing the ingredients towards the first extremity of the mixing chamber 200 and mixing them there, and when it rotates in the second direction of rotation, the mixing paddle 100 thus has the effect of displacing the ingredients towards the second extremity of the mixing chamber 200 and pushing them through the opening 211.

As seen in FIG. 5a, the second portions 110b and 120b are adjusted to the diameter of the pot 210, and in order to limit the risks of trapping if there are granules or solid particles in the mash between the mixing paddle 100 and the pot 210, it is envisioned that the second portions 110b and 120b are at least partly flexible, to be able to change shape, and "pass above these granules or solid particles." A silicone part on the second portions 110b and 120b can therefore be envisioned.

Figure 2:
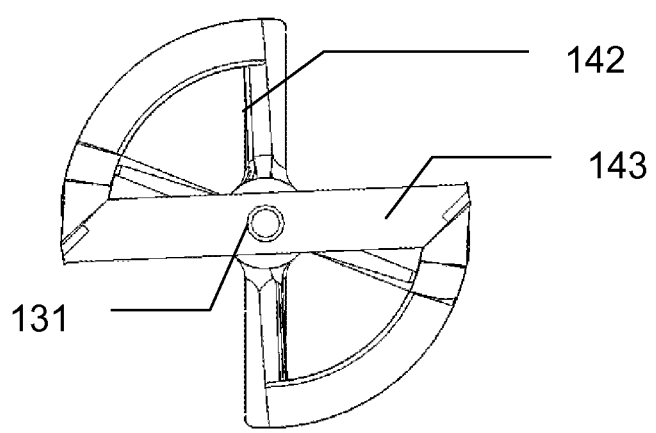
FIG. 2 represents the mixing paddle of FIG. 1, seen according to the direction II of FIG. 1.
Figure 3:
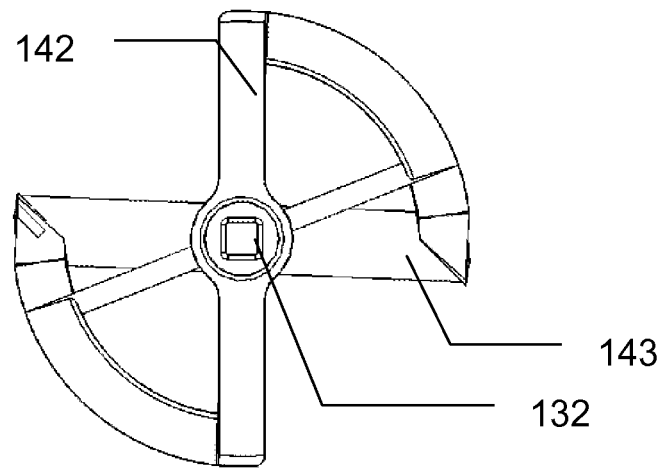
FIG. 3 represents the mixing paddle of FIG. 1, seen according to the direction III of FIG. 1.

As represented on FIGS. 1, 2 and 3, the mixing paddle 100 comprises connecting tabs between the eccentric arms 110 and 120 in order to ensure rigidity of the mixing paddle 100. In particular, two radial arms 142 and 143 are provided at the extremities of the mixing paddle 100, to attach the eccentric arms 110 and 120 and a central part of the mixing paddle 100.

In addition, a radial tab 141 is provided at the center of the mixing paddle 100, and a longitudinal tab 151 is provided at the rotation axis 150 to further rigidify the assembly and prevent deformations by twisting or bending, which could lead the mixing paddle 100 to become stuck in the mixing chamber 200.

FIG. 2 also shows a centering 131 (a drilling) which forms an anchorage to ensure a quality pivoting connection with the mixing chamber 200 where a corresponding pin is arranged in the cover 220.

Finally, FIG. 3 shows a square drive 132 which is designed to form another anchorage and engage with a driver of the preparation appliance 500, situated at the bottom of the housing 350. A different asymmetrical shape can be provided instead of the square drive 132 to drive the mixing paddle 100, a shape preventing rotation being sufficient.

Figure 8:
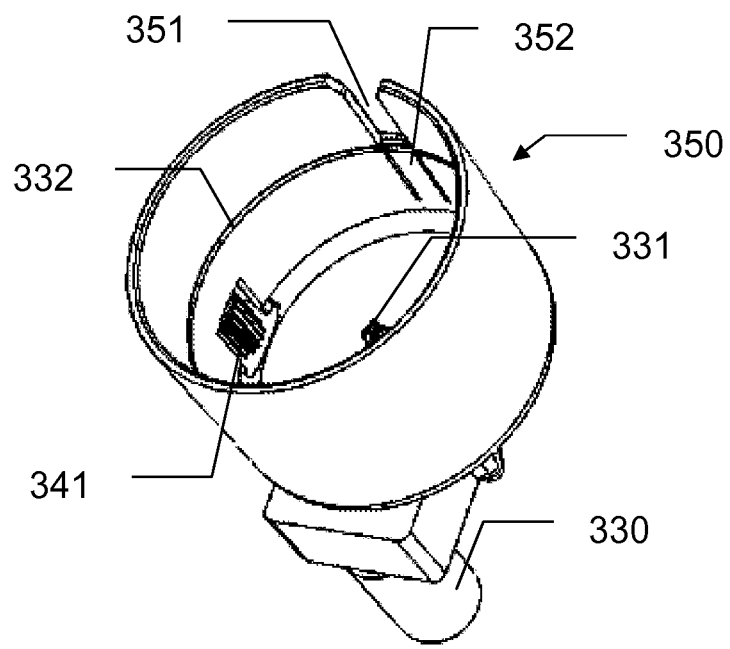
FIG. 8 represents a perspective view of the bottom of a housing of the preparation appliance of FIG. 6.

FIG. 8 represents a perspective view of the bottom of the housing 350 of the preparation appliance 500. The geared motor 340 and its pinion 341 are seen there, but also a geared motor 330 arranged to drive the mixing paddle 100 in rotation by means of a driver 331 visible at the bottom of the housing 350.

A slot 351 arranged in the cylindrical wall of the housing 350 is also seen, to allow passage of a hook 213 (visible in FIG. 5b) of the pot 210, in order to guarantee that the opening 211 is in the upper part of the mixing chamber 200, once it is in place in or on the preparation appliance 500.

The slot 351 ends on a strip or flexible tab 352 which comprises a portion of a throat 332 arranged over 360° on the inner face of the housing 350.

When the mixing chamber is inserted on the preparation appliance 500, the hook 213 is then guided by the slot 351, and raises the flexible tab 352, to reach the throat 332. Thus, the mixing chamber is integral with the housing 350, the opening 211 being at the top. The first preparation phase may begin with supplying the ingredients by gravity into the mixing chamber 200 and mixing with the mixing paddle 100 which rotates in the first direction of rotation.

Then, the mixing paddle is stopped, and the mixing chamber 200 is pivoted by the geared motor 340 to make the opening 211 pass to the lower part of the mixing chamber 200. This movement is allowed and guided by the throat 332 which accommodates the hook 213.

The mixing chamber 200 is stopped in dispensing position, with the opening 211 in the low position, the mixing paddle may then be put into rotation according to the second direction of rotation, to expel the ingredients through the opening 211 in the form of mash. The opening has beveled edges to prevent the mash from sticking to the edges of the opening 211.

Finally, once the mixing chamber 200 is empty, the mixing paddle 100 may again be stopped, and the mixing chamber 200 may again be pivoted to return to the mixing position. A new preparation may be initiated, or the mixing chamber 200 may be removed by the user, because by seizing the outer portion of the mixing chamber 200 at the cap (the cover 220, for example), the flexible tab can release the hook 213.

Figure 7:
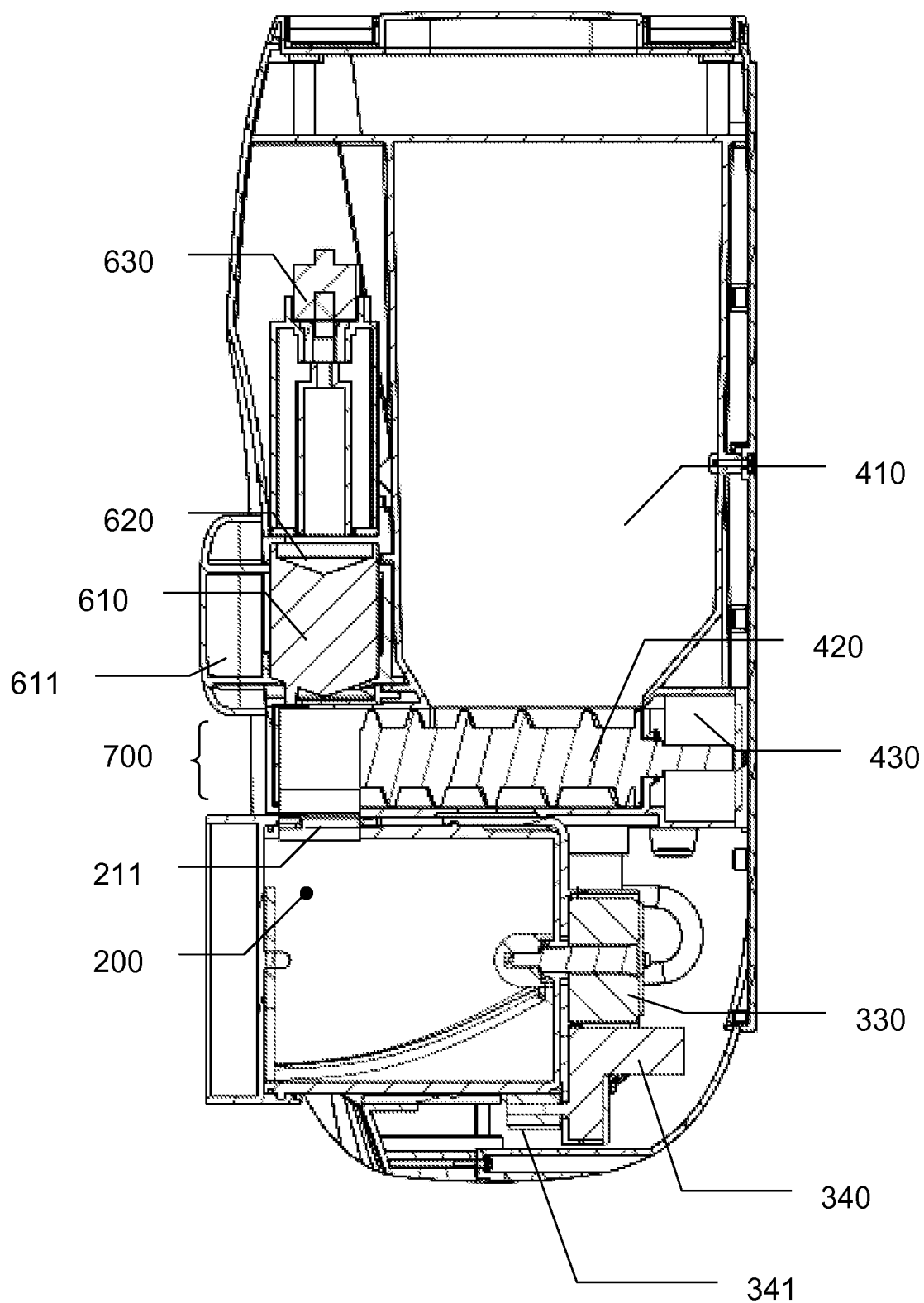
FIG. 7 represents a cross section of the animal feed preparation appliance of FIG. 6.

Again in FIG. 7, we can see the tray 410 which forms means for storing the dehydrated feed, with a screw 420, which may be a helicoidal screw, connected to an electric motor 430, which may be a geared motor. The screw 420 is thus designed to remove dehydrated feed from the tray 410, and transport it to a dispensing area 700, above the opening 211 (because the mixing chamber 200 is in the first position).

In FIG. 7, we also see the removable cartridge 610 positioned above the dispensing area 700, and containing a food supplement such as vitamins, trace elements, health products (such as a deworming product, for example), in order to personalize and tailor the feed ration to be prepared, depending on the animal's needs. The removable cartridge 610 contains a food supplement ideally in liquid or paste form, and the preparation appliance 500 comprises a motor 630 designed to move a piston 620, in order to force a predetermined amount of food supplement to fall into the mixing chamber 200.

The removable cartridge 610 is mounted on the support 611 which makes it possible to receive it and index it via an indexing pin 612 (visible in FIG. 12), in order to position it correctly in the preparation appliance 500.

As seen in FIG. 11, the preparation appliance 500 comprises the liquid reservoir 800, designed to form liquid storing means, and to store water, for example. The liquid reservoir 800 is removably mounted so that it can easily be filled, washed or dried.

Figure 9:
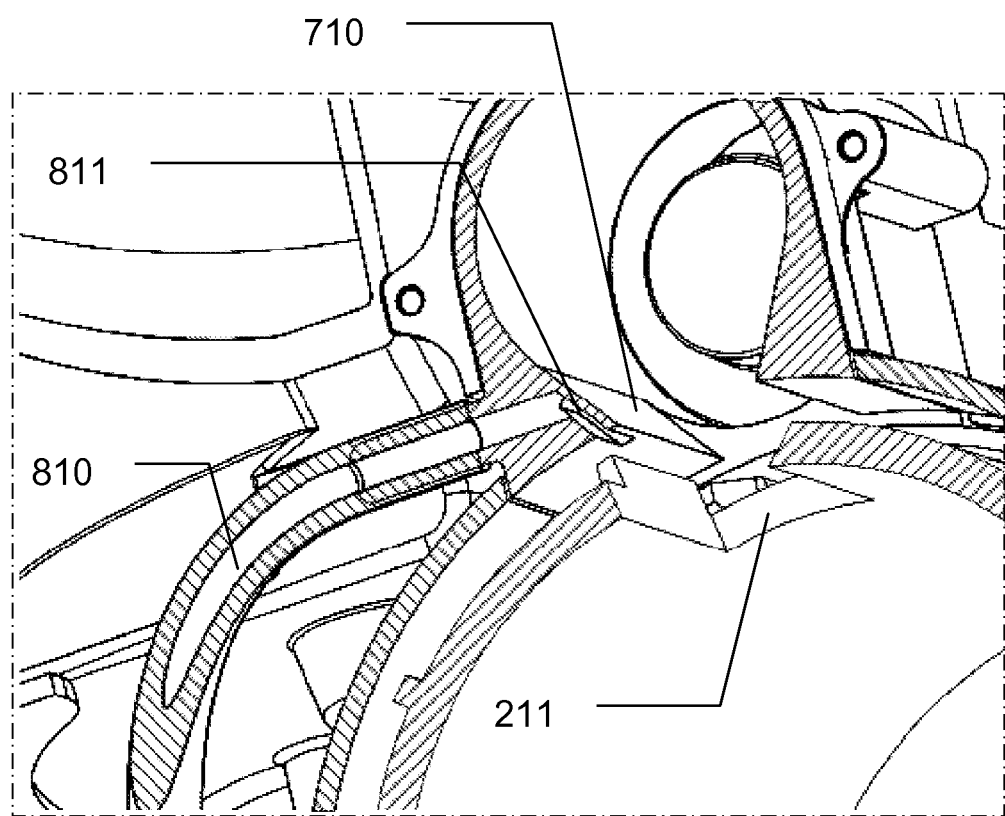
FIG. 9 represents a perspective view of a dispensing area of the preparation appliance of FIG. 6.

The liquid reservoir 800 is connected to a supply channel 810, a downstream extremity 811 of which is seen in FIG. 9. On this cross section figure, we see a part of the opening 211 and the walls 710 which define the dispensing area 700. The downstream extremity 811 of the supply channel 810 is thus positioned above the opening 211, but it is also offset in relation to the walls 710, to prevent any contact or run-off of water on the walls 710 of the dispensing area, but also with the walls of the opening 211, which will prevent the dehydrated feed from adhering to and fouling these walls. The downstream extremity 811 is thus opposite the opening 211, and it is offset in relation to the supply of dehydrated feed and food supplement so that these three ingredients can be added to the mixing chamber 200 at the same time without contact between one another, to prevent stains in the dispensing area 700, which is not removable.

It will be understood that various modifications and/or improvements obvious to the person skilled in the art may be made to various embodiments of the invention described in this description without departing from the context of the invention defined by the attached claims.

The invention claimed is:

1. A preparation appliance for preparing animal feed, comprising:
a first storage container for storing a dehydrated feed,
a second storage container for storing a liquid such as water,
a mixing chamber designed to receive a portion of dehydrated feed and a portion of liquid,
a mixer movably arranged in the mixing chamber to mix the portion of dehydrated feed and the portion of liquid to form a feed ration in paste form,
a consumption container designed to receive the feed ration, wherein:
the mixing chamber comprises an opening,
the mixing chamber is mounted such that the mixing chamber is movable in relation to the preparation appliance, in order to go from a first position, or mixing position, in which the opening is opposite an area for dispensing of dehydrated feed and liquid, to a second position, or dispensing position, in which the opening is opposite the consumption container,
wherein the mixer is configured to rotate about a first rotation axis to mix the portion of dehydrated feed and the portion of liquid and wherein the mixing chamber is configured to rotate about said first rotation axis to go from said first position to said second position.

2. The preparation appliance according to claim 1, wherein, when the mixing chamber is in the first position, the opening is situated in the upper part of the mixing chamber, and wherein, when the mixing chamber is in the second position, the opening is situated in the lower part of the mixing chamber.

3. The preparation appliance according to claim 1, wherein the mixer comprises a mixing paddle.

4. The preparation appliance according to claim 3, wherein the mixing paddle is able to move in rotation about the first rotation axis.

5. The preparation appliance according to claim 4, wherein the mixing paddle is configured to guide the ingredients from the mixing chamber towards an extremity of the mixing chamber opposite the opening when the mixing paddle pivots in a first direction of rotation, and wherein the mixing paddle is configured to guide the ingredients from the mixing chamber towards the opening when the mixing paddle pivots in a second direction of rotation.

6. A preparation appliance for preparing animal feed, comprising:
a first storage container for storing a dehydrated feed,
a second storage container for storing a liquid such as water, a mixing chamber designed to receive a portion of dehydrated feed and a portion of liquid, a mixer movably arranged in the mixing chamber to mix the portion of dehydrated feed and the portion of liquid to form a feed ration in paste form, a consumption container designed to receive the feed ration, wherein:

the mixing chamber comprises an opening, the mixing chamber is mounted such that the mixing chamber is movable in relation to the preparation appliance, in order to go from a first position, or mixing position, in which the opening is opposite an area for dispensing of dehydrated feed and liquid, to a second position, or dispensing position, in which the opening is opposite the consumption container, wherein the preparation appliance further comprises a channel for supply of liquid, with a downstream extremity arranged above the opening when the mixing chamber is in the first position, so as to cause the liquid to flow into the mixing chamber without contact with the dispensing area and/or the opening.

7. The preparation appliance according to claim 6, comprising a supply system configured to supply the mixing chamber with dehydrated feed, with a dehydrated feed supply hatch configured to cause the dehydrated feed to fall through the opening into the mixing chamber in the first position, and wherein the supply hatch and the downstream extremity of the liquid supply channel are offset and at a distance from one another so as to allow the mixing chamber to be supplied with liquid and dehydrated feed simultaneously, without contact between the liquid and the dehydrated feed at the dispensing area and/or at the opening.

8. The preparation appliance according to claim 7, wherein the supply system configured to supply the mixing chamber with dehydrated feed comprise a feed screw arranged between the first storage container for storing the dehydrated feed and the supply hatch.

9. The preparation appliance according to claim 8, wherein the dispensing area comprises inclined walls configured to redirect the dehydrated feed and guide the dehydrated feed towards the opening of the mixing chamber in the first position.

10. The preparation appliance according to claim 1, comprising a third storage container for storing a food supplement.

11. The preparation appliance according to claim 10, wherein the food supplement is contained in a removable cartridge.

12. The preparation appliance according to claim 11, wherein the removable cartridge comprises a piston, and wherein the appliance comprises a pushing system configured to move the piston a predetermined distance.

13. The preparation appliance according to claim 7, comprising a removable cartridge for storing a food supplement that comprises an outlet arranged above the opening of the mixing chamber in the first position, and wherein an outlet of the removable cartridge, the supply hatch and the downstream extremity of the liquid supply channel are offset and at a distance from one another, so as to allow the mixing chamber to be supplied with food supplement and liquid and/or dehydrated feed simultaneously, without contact between the food supplement and the liquid and/or dehydrated feed at the dispensing area and/or at the opening.

14. The preparation appliance according to claim 10, wherein the food supplement is in liquid form.

15. A preparation appliance for preparing animal feed, comprising:

a first storage container for storing a dehydrated feed, a second storage container for storing a liquid such as water, a mixing chamber designed to receive a portion of dehydrated feed and a portion of liquid, a mixer movably arranged in the mixing chamber to mix the portion of dehydrated feed and the portion of liquid to form a feed ration in paste form, a consumption container designed to receive the feed ration, wherein:

the mixing chamber comprises an opening, the mixing chamber is mounted such that the mixing chamber is movable in relation to the preparation appliance, in order to go from a first position, or mixing position, in which the opening is opposite an area for dispensing of dehydrated feed and liquid, to a second position, or dispensing position, in which the opening is opposite the consumption container, wherein the mixer remains in the mixing chamber when the mixing chamber is positioned from said first position to said second position.

* * * * *